United States Patent
Adam et al.

(10) Patent No.: US 12,005,903 B2
(45) Date of Patent: Jun. 11, 2024

(54) METHOD FOR COMPLETING OVERTAKE MANEUVERS IN VARIANT TRAFFIC CONDITIONS

(71) Applicant: GM GLOBAL TECHNOLOGY OPERATIONS LLC, Detroit, MI (US)

(72) Inventors: Paul A Adam, Milford, MI (US); Jeffrey S Parks, Ann Arbor, MI (US); Christopher J Trush, Novi, MI (US); Christopher Michael Churay, Famington Hills, MI (US); Namal P Kumara, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 322 days.

(21) Appl. No.: 17/643,482

(22) Filed: Dec. 9, 2021

(65) Prior Publication Data
US 2023/0182740 A1 Jun. 15, 2023

(51) Int. Cl.
| | |
|---|---|
| *B60W 30/18* | (2012.01) |
| *B60W 30/14* | (2006.01) |
| *B60W 30/16* | (2020.01) |
| *B60W 40/04* | (2006.01) |
| *B60W 40/105* | (2012.01) |

(52) U.S. Cl.
CPC .... *B60W 30/18163* (2013.01); *B60W 30/143* (2013.01); *B60W 30/16* (2013.01); *B60W 40/04* (2013.01); *B60W 40/105* (2013.01); *B60W 2554/802* (2020.02); *B60W 2554/804* (2020.02)

(58) Field of Classification Search
CPC ......... B60W 30/18163; B60W 30/143; B60W 30/16; B60W 40/04; B60W 40/105; B60W 2554/804; B60W 2554/802
USPC .......................................................... 701/41
See application file for complete search history.

(56) References Cited

U.S. PATENT DOCUMENTS

| | | | |
|---|---|---|---|
| 9,672,734 B1 * | 6/2017 | Ratnasingam | H04W 4/44 |
| 9,836,056 B2 * | 12/2017 | Ansari | G06T 17/00 |
| 2017/0052540 A1 * | 2/2017 | Lokesh | B60W 60/0051 |
| 2017/0053534 A1 * | 2/2017 | Lokesh | H04L 67/12 |
| 2018/0079420 A1 * | 3/2018 | Aine | B60W 10/20 |
| 2019/0291728 A1 * | 9/2019 | Shalev-Shwartz | G01S 17/58 |
| 2022/0009492 A1 * | 1/2022 | Adwan | B60W 40/105 |
| 2022/0135039 A1 * | 5/2022 | Jardine | B60W 30/18159 701/26 |

* cited by examiner

*Primary Examiner* — Hung Q Nguyen
*Assistant Examiner* — Anthony Donald Taylor, Jr.
(74) *Attorney, Agent, or Firm* — Lorenz & Kopf LLP

(57) ABSTRACT

In an exemplary embodiment, a vehicle system is provided that includes a sensor array and a processor. The sensor array is configured to generate vehicle sensor data pertaining to a target vehicle in proximity to the vehicle. The processor is coupled to the sensor array, and is configured to at least facilitate: beginning an overtake maneuver for the vehicle, via instructions provided to the drive system, when conditions for an overtake of the target vehicle by the vehicle are initially determined by the processor to be valid; subsequent to the beginning of the overtake maneuver, determining via the processor whether the conditions for the overtake of the target vehicle are still valid, based on updated sensor data reflecting variant traffic conditions; and further controlling the overtake maneuver based on the determining as to whether the conditions for the overtake of the target vehicle are still valid.

20 Claims, 3 Drawing Sheets

METHOD FOR COMPLETING OVERTAKE MANEUVERS IN VARIANT TRAFFIC CONDITIONS

The technical field generally relates to vehicles and, more specifically, to methods and systems for controlling a vehicle's overtaking of another vehicle along a roadway under variant traffic conditions.

Certain vehicles today include functionality for the vehicle to overtake another vehicle, for example that is travelling in the same lane along a roadway. However, such existing vehicle systems may not always provide optimal results for overtaking the other vehicle under variant traffic conditions, such as when the other vehicle changes its velocity.

Accordingly, it is desirable to provide improved methods and systems for controlling vehicle overtake maneuvers under variant traffic conditions. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes: obtaining, via one or more sensors of a host vehicle, vehicle sensor data pertaining to a target vehicle in proximity to the host vehicle; beginning an overtake maneuver for the host vehicle, via instructions provided a processor of the host vehicle, when conditions for an overtake of the target vehicle by the host vehicle are initially determined by the processor to be valid; subsequent to the beginning of the overtake maneuver, determining via the processor whether the conditions for the overtake of the target vehicle are still valid, based on updated sensor data reflecting variant traffic conditions; and further controlling the overtake maneuver based on the determining as to whether the conditions for the overtake of the target vehicle are still valid, via instructions provided by the processor.

Also in an exemplary embodiment, the conditions for the overtake of the target vehicle are based at least in part on a speed of the host vehicle, a relative speed between the host vehicle and the target vehicle, and a distance between the host vehicle and the target vehicle.

Also in an exemplary embodiment, the conditions for the overtake of the target vehicle are also based at least in part on one or more additional target vehicles in proximity to the host vehicle.

Also in an exemplary embodiment, the step of further controlling the overtake maneuver includes: continuing the overtake maneuver via instructions provided by the processor, when it is determined by the processor that the conditions for the overtake of the target vehicle are still valid; and suspending the overtake maneuver via instructions provided by the processor, when it is determined by the processor that the conditions for the overtake of the target vehicle are no longer valid.

Also in an exemplary embodiment, the determining of whether the conditions for the overtake of the target vehicle are still valid is based at least in part on a change in speed of the target vehicle and also based at least in part on whether a required change in speed of the host vehicle to overtake the target vehicle would exceed a predetermined threshold.

Also in an exemplary embodiment, the determining of whether the conditions for the overtake of the target vehicle are still valid is based at least in part on a comparison of: a pull zone, in which the host vehicle would speed up further to pass in front of the target vehicle; and a push zone, in which the host vehicle would slow down to return to an original lane behind the target vehicle.

Also in an exemplary embodiment, the determining of whether the conditions for the overtake of the target vehicle are still valid is based at least in part on: a pull zone weight, based on a distance of the host vehicle from a rear bumper of the target vehicle; and a push zone weight, based on a distance of the host vehicle from a front bumper of the target vehicle.

In another exemplary embodiment, a system is provided that includes a sensor array and a processor. The sensor array includes one or more sensors of a host vehicle, and is configured to generate vehicle sensor data pertaining to a target vehicle in proximity to the host vehicle. The processor is coupled to the sensor array, and is configured to at least facilitate: beginning an overtake maneuver for the host vehicle when conditions for an overtake of the target vehicle by the host vehicle are initially determined by the processor to be valid; subsequent to the beginning of the overtake maneuver, determining whether the conditions for the overtake of the target vehicle are still valid, based on updated sensor data reflecting variant traffic conditions; and further controlling the overtake maneuver based on the determining as to whether the conditions for the overtake of the target vehicle are still valid.

Also in an exemplary embodiment, the conditions for the overtake of the target vehicle are based at least in part on a speed of the host vehicle, a relative speed between the host vehicle and the target vehicle, and a distance between the host vehicle and the target vehicle.

Also in an exemplary embodiment, the conditions for the overtake of the target vehicle are also based at least in part on one or more additional target vehicles in proximity to the host vehicle.

Also in an exemplary embodiment, the processor is further configured to at least facilitate: continuing the overtake maneuver when it is determined by the processor that the conditions for the overtake of the target vehicle are still valid; and suspending the overtake maneuver when it is determined by the processor that the conditions for the overtake of the target vehicle are no longer valid.

Also in an exemplary embodiment, the processor is further configured to at least facilitate determining whether the conditions for the overtake of the target vehicle are still valid based at least in part on a change in speed of the target vehicle and also based at least in part on whether a required change in speed of the host vehicle to overtake the target vehicle would exceed a predetermined threshold.

Also in an exemplary embodiment, the processor is further configured to at least facilitate determining whether the conditions for the overtake of the target vehicle are still valid based at least in part on a comparison of: a pull zone, in which the host vehicle would speed up further to pass in front of the target vehicle; and a push zone, in which the host vehicle would slow down to return to an original lane behind the target vehicle.

Also in an exemplary embodiment, wherein the processor is further configured to at least facilitate determining whether the conditions for the overtake of the target vehicle are still valid based at least in part on: a pull zone weight, based on a distance of the host vehicle from a rear bumper of the target vehicle; and a push zone weight, based on a distance of the host vehicle from a front bumper of the target vehicle.

In another exemplary embodiment, a vehicle is provided that includes: a body; a drive system; a sensor array, and a processor. The drive system is configured to generate movement of the body. The sensor array includes one or more sensors of the vehicle, and is configured to generate vehicle sensor data pertaining to a target vehicle in proximity to the vehicle. The processor is coupled to the sensor array, and is configured to at least facilitate: beginning an overtake maneuver for the vehicle, via instructions provided to the drive system, when conditions for an overtake of the target vehicle by the vehicle are initially determined by the processor to be valid; subsequent to the beginning of the overtake maneuver, determining via the processor whether the conditions for the overtake of the target vehicle are still valid, based on updated sensor data reflecting variant traffic conditions; and further controlling the overtake maneuver based on the determining as to whether the conditions for the overtake of the target vehicle are still valid.

Also in an exemplary embodiment, the conditions for the overtake of the target vehicle are based at least in part on a speed of the vehicle, a relative speed between the vehicle and the target vehicle, and a distance between the vehicle and the target vehicle.

Also in an exemplary embodiment, the processor is further configured to at least facilitate: continuing the overtake maneuver when it is determined by the processor that the conditions for the overtake of the target vehicle are still valid; and suspending the overtake maneuver when it is determined by the processor that the conditions for the overtake of the target vehicle are no longer valid.

Also in an exemplary embodiment, the processor is further configured to at least facilitate determining whether the conditions for the overtake of the target vehicle are still valid based at least in part on a change in speed of the target vehicle and also based at least in part on whether a required change in speed of the vehicle to overtake the target vehicle would exceed a predetermined threshold.

Also in an exemplary embodiment, the processor is further configured to at least facilitate determining whether the conditions for the overtake of the target vehicle are still valid based at least in part on a comparison of: a pull zone, in which the vehicle would speed up further to pass in front of the target vehicle; and a push zone, in which the vehicle would slow down to return to an original lane behind the target vehicle.

Also in an exemplary embodiment, the processor is further configured to at least facilitate determining whether the conditions for the overtake of the target vehicle are still valid based at least in part on: a pull zone weight, based on a distance of the vehicle from a rear bumper of the target vehicle; and a push zone weight, based on a distance of the vehicle from a front bumper of the target vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
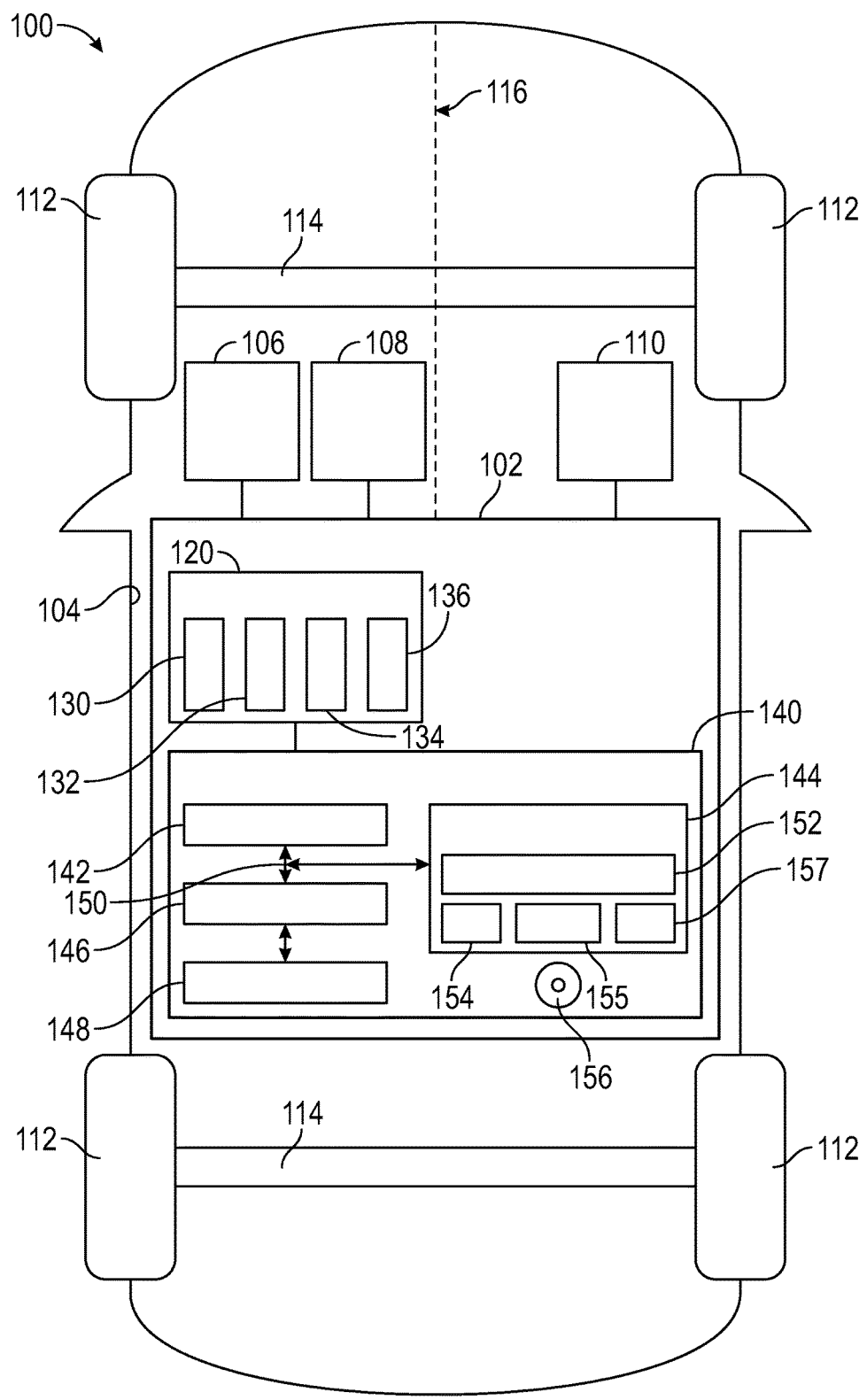
FIG. 1 is a functional block diagram of a vehicle that includes a control system for controlling vehicle overtake maneuvers for the vehicle, including under variant traffic conditions, in accordance with exemplary embodiments.

FIG. 1 illustrates a vehicle 100, according to an exemplary embodiment. As described in greater detail further below, the vehicle 100 includes a control system 102 that is configured for controlling overtake maneuvers for the vehicle 100, in accordance with exemplary embodiments.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

The vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. In certain embodiments, the drive system 110 comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the vehicle also includes a braking system 106 and a steering system 108 in various embodiments. In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering column coupled to the axles 114 and/or the wheels 112) that are controlled via inputs provided by a driver (e.g., via a steering wheel in certain embodiments) and/or automatically via the control system 102.

In the embodiment depicted in FIG. 1, the control system 102 is coupled to the braking system 106, and the drive system 110. In certain embodiments, the control system 102 may also be coupled to the steering system 108. Also as depicted in FIG. 1, in various embodiments, the control system 102 includes a sensor array 120, and a controller 140.

In various embodiments, the sensor array 120 includes various sensors that obtain sensor data for use in controlling movement of the vehicle 100 (also referred to herein as the "host" vehicle), including with respect to overtaking another vehicle (also referred to herein as a "target" vehicle) along a roadway or path (collectively herein referred to as a "roadway") on which the vehicle 100 is travelling. In the depicted embodiment, the sensor array 120 includes speed sensors 130, detection sensors 132, and input sensors 134. In certain embodiments, the sensor array 120 may also include one or more other sensors 136 (e.g., in certain embodiments, one or more steering sensors, braking sensors, and so on).

In various embodiments, the speed sensors 130 include one or more wheel speed sensors and/or other sensors configured to measure a speed and/or velocity of the vehicle 100 and/or data used to calculate the speed and/or velocity of the vehicle 100.

Also in various embodiments, the detection sensors 132 include one or more sensors that are configured to detect and ascertain measurements with respect to one or more target vehicles that are travelling in proximity to the vehicle 100 along the same roadway as the vehicle 100. In certain embodiments, the detection sensors 132 may include one or more cameras, radar, lidar, sonar, and/or other sensors that are configured to detect such target vehicles.

Also in various embodiments, the input sensors 134 include one or more sensors that are configured to receive inputs from a driver and/or one or more other operators and/or users of the vehicle 100. For example, in certain embodiments, the input sensors 134 may include one or more touch screens, dials, buttons, audio sensors (e.g., microphones) and/or other sensors configured to receive inputs from the driver and/or other users as to the driver and/or user's intent, including as to cruise control functionality of the vehicle 100.

Also in certain embodiments, the other sensors 136 may include one or more accelerometers, steering angle sensors, and/or other sensors for the vehicle 100.

In various embodiments, the controller 140 is coupled to the sensor array 120, and provides instructions to and controls operation thereof. In various embodiments, the controller 140 may also be coupled to, provide instructions to, and control operation of the braking system 106, the steering system 108, the drive system 110, and/or one or more other vehicle systems and/or components. Also in various embodiments, the controller 140 comprises a computer system (also referred to herein as computer system 140), and includes a processor 142, a memory 144, an interface 146, a storage device 148, and a computer bus 150. In various embodiments, the controller (or computer system) 140 controls vehicle operation, including controlling overtake maneuvers for the vehicle 100 with respect to target vehicles in proximity thereto along the roadway in which the vehicle 100 is travelling. In various embodiments, the controller 140 provides these and other functions in accordance with the steps of the process of FIG. 2 and the implementation of FIG. 3, for example in connection with a cruise control functionality for the vehicle 100.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process of FIG. 2 and the implementation of FIG. 3 and described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with map data 154, one or more tables 155 (e.g., look-up tables for controlling vehicle actions, including with respect to vehicle speed, a difference in speed between the host vehicle 100 and the target vehicle, and a distance between the host vehicle 100 and the target vehicle), and one or more stored values 156 (e.g., including, in various embodiments, one or more threshold values for controlling vehicle actions, including vehicle speed and changes thereto in executing vehicle overtake maneuvers).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process of FIG. 2 and the implementation of FIG. 3 and descried further below in connection therewith. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
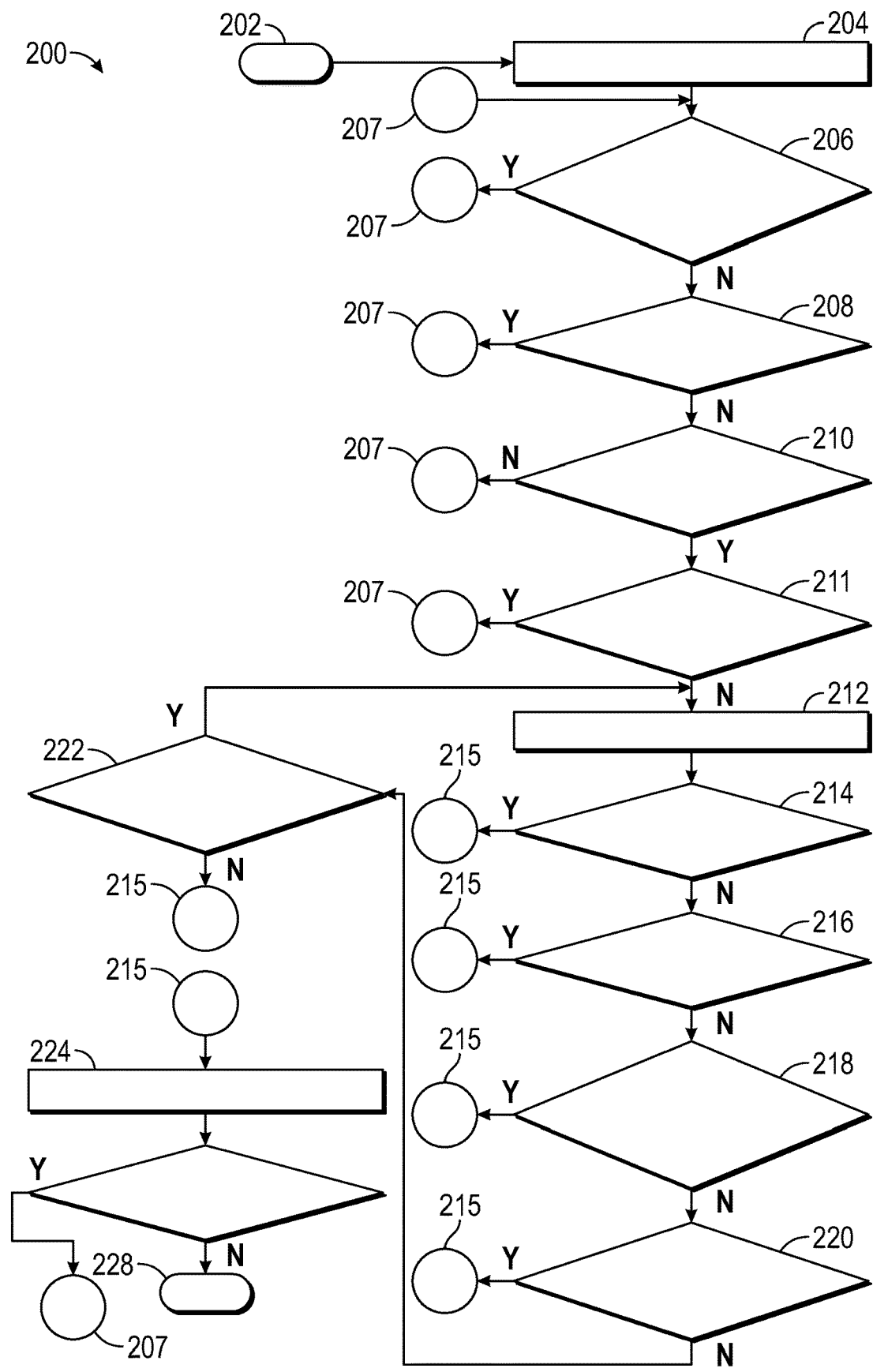
FIG. 2 is a flowchart of process for controlling vehicle overtake maneuvers, in accordance with an exemplary embodiment.

FIG. 2 is a flowchart of a high level representation of a process 200 for controlling vehicle overtake maneuvers, in accordance with an exemplary embodiment. In various embodiments, the process 200 may be implemented in connection with the vehicle 100 and control system 102 of FIG. 1 and the components thereof.

Figure 3:
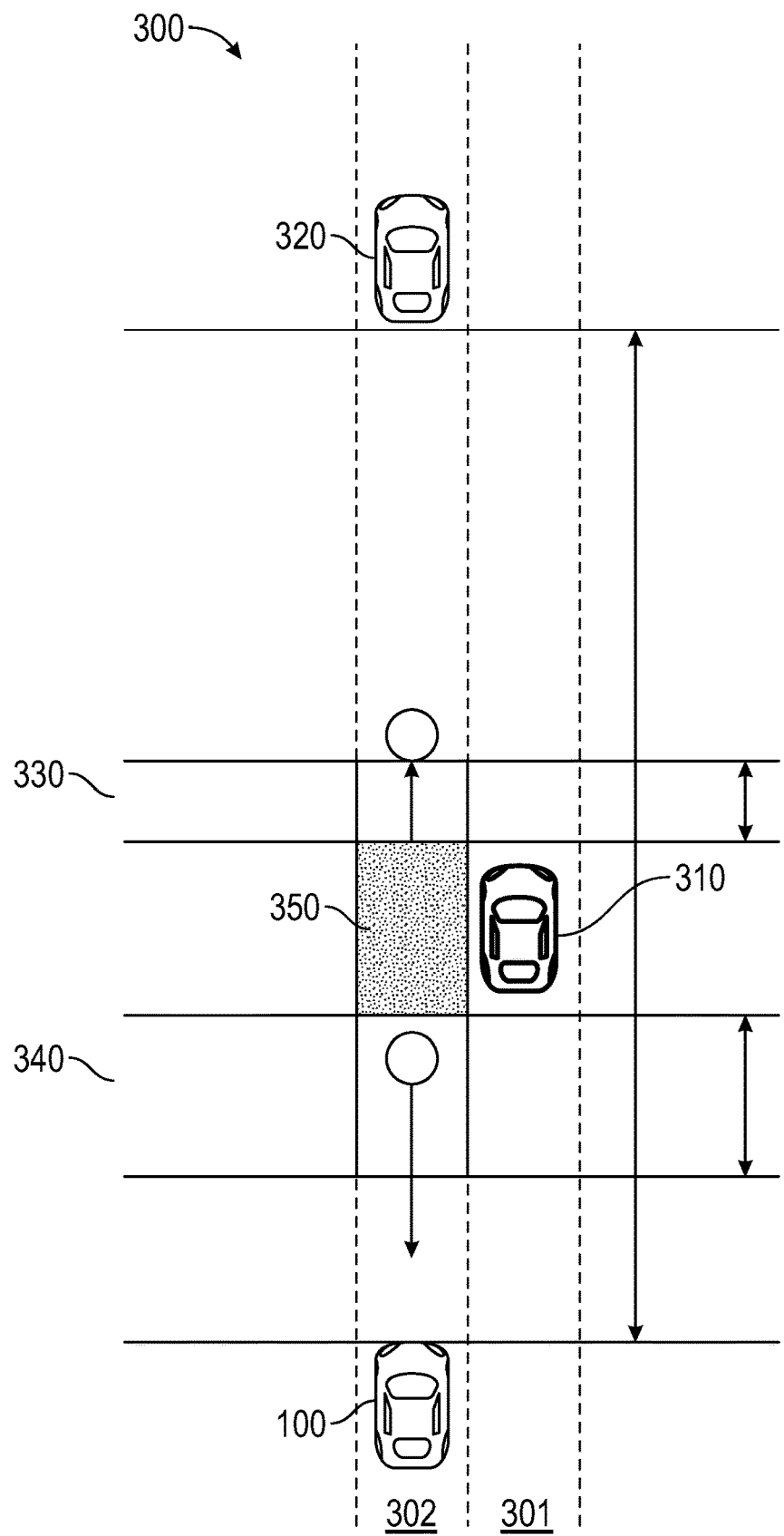
FIG. 3 is a depiction of a roadway in which the process of FIG. 2 may be implemented, in accordance with an exemplary embodiment.

The process 200 of FIG. 2 is also described below in connection with an implementation thereof as depicted in FIG. 3. Specifically, FIG. 3 depicts a roadway 300 in which the vehicle 100 of FIG. 1 is travelling. As depicted in FIG. 3, the roadway 300 includes at least two adjacent lanes, namely a first lane 301 and a second lane 302. In various embodiments, the process 200 of FIG. 2 begins with the host vehicle 100 and the target vehicle 310 both travelling in the first lane 301. Also in various embodiments, the process 200 continues (as described in greater detail below) as the host vehicle 100 attempts to overtake the target vehicle 310 by using the second lane 302 to pass the target vehicle 310, and then by ultimately returning to the first lane 301.

With reference back to FIG. 2, the process 200 begins at 202. In one embodiment, the process 200 begins when a vehicle drive or ignition cycle begins, for example when a driver approaches or enters the vehicle 100, or when the driver turns on the vehicle and/or an ignition therefor (e.g. by turning a key, engaging a keyfob or start button, and so on). In one embodiment, the steps of the process 200 are performed continuously during operation of the vehicle.

Also as depicted in FIG. 2, the control system is activated at 204. In various embodiments, the control system 102 is activated for automated vehicle overtake functionality based on inputs provided by a driver or other operator of the vehicle 100, for example via one or more input devices as detected by one or more input sensors 134 of FIG. 1. Also in various embodiments, as the control system is activated, sensor data is also obtained via the detection sensors 132 of FIG. 1, including as to any other vehicles (i.e., "target vehicles", such as the target vehicle 310 of FIG. 3) in proximity to the vehicle 100 along the roadway on which the vehicle 100 is travelling (i.e., such as the roadway 300 of FIG. 3).

In various embodiments a determination is made as to whether an assessor is requesting a lane change (step 206). For example, in certain embodiments, this may be satisfied when a different lane change is being requested and/or for one or more other reasons than an automated overtake of the target vehicle. By way of example, in various embodiments, the vehicle 100 has many software components (e.g., "assessors") that can request an automated lane change, including but not limited to overtaking slow vehicles, returning to an open right lane, leaving a lane that will end soon, following a navigation route, avoiding a lane with heavy traffic, and so on. In various embodiments, the determination of step 206 helps to ensure that the process does not command the speed increase if an automated lane change will be commanded soon. In various embodiments, this is determined by the processor 142 of FIG. 1.

In various embodiments, if it is determined that an assessor is requesting a lane change, then the vehicle overtake is not initiated (207), and the process returns to 206 in a new iteration (e.g., including updated sensor data from the detection sensors 132). Conversely, in various embodiments, if it is instead determined that an assessor is not requesting the lane change, then the process proceeds instead to 208, described below.

In various embodiments, during 208, a determination is made as to whether a backoff is active. For example, in certain embodiments, this may be satisfied when the vehicle overtake system or functionality is paused or temporarily turned off. In various embodiments, this is determined by the processor 142 of FIG. 1.

In various embodiments, if it is determined that a backoff is active, then the vehicle overtake is not initiated (207), and the process returns to 206 in a new iteration (e.g., including updated sensor data from the detection sensors 132). Conversely, in various embodiments, if it is instead determined that a backoff is not active, then the process proceeds instead to 210, described below.

In various embodiments, during 210, a determination is made as to whether initial passing criteria is valid with respect to a target vehicle is in proximity to the host vehicle. For example, in certain embodiments, the passing criteria is deemed to be valid when both of the following conditions occur, namely: (i) a velocity difference between the host vehicle 100 and the target vehicle exceeds a predetermined speed difference threshold (with the host vehicle 100 having the greater relative velocity); and (ii) a distance between the host vehicle 100 and the target vehicle is less than a predetermined distance threshold. In various embodiments, the predetermined velocity and distance thresholds are stored in the memory 144 of FIG. 1 as stored values 157 thereof. For example, in one exemplary embodiment, at a speed difference of one half meters per second (0.5 m/s), the process may start the speed command if the right target vehicle is less than thirty five meters (35 m) in distance in front of the host vehicle 100; however, this may vary in other embodiments. In various embodiments, these determinations are made by the processor 142 of FIG. 1 based on sensor data from the sensor array 120 of FIG. 1, including from the speed sensors 130 and detection sensors 132 thereof.

In various embodiments, if it is determined that a target vehicle is not in proximity to the host vehicle, then the vehicle overtake is not initiated (207), and the process returns to 206 in a new iteration (e.g., including updated sensor data from the detection sensors 132). Conversely, in various embodiments, if it is instead determined that a target vehicle is in proximity to the host vehicle, then the process proceeds instead to 211, described below.

In various embodiments, during 211, a determination is made as to whether a lead blocking target is in front of the host vehicle. For example, in certain embodiments, this may be satisfied when a second target vehicle is present in a lane in which the host vehicle 100 would use to overtake the target vehicle. For example, with reference to FIG. 3, this condition may be satisfied when a second target vehicle 320 is disposed within the second lane 302 of FIG. 3 in sufficient proximity to the vehicle 100 such that the second target vehicle 320 would impair the host vehicle 100's ability to overtake target vehicle 310. For example, in certain embodiments, this may be satisfied when a distance between the second target vehicle 320 and the host vehicle 100 (e.g., as ascertained via sensor data from one or more detection sensors 132 of FIG. 1) is less than a predetermined threshold stored in the memory 144 of FIG. 1 as a stored value 157 thereof. In one embodiment, this predetermined threshold may be equal to approximately thirty meters (30 m); however, this may vary in other embodiments. In various embodiments, this is determined by the processor 142 of FIG. 1.

In various embodiments, if it is determined that a lead blocking target is in front of the host vehicle, then the vehicle overtake is not initiated (207), and the process returns to 206 in a new iteration (e.g., including updated sensor data from the detection sensors 132). Conversely, in various embodiments, if it is instead determined that a lead blocking target is not in front of the host vehicle, then the process proceeds instead to 212, described below.

In various embodiments, during 212, a speed is increased for the host vehicle. In various embodiments, during 212, an initial speed increase is provided for the host vehicle 100 to initiate a overtake (or passing) of the target vehicle (such as the target vehicle 310 of FIG. 1). In various embodiments, the initial speed increase is approximately equal to a predetermined threshold stored in the memory 144 of FIG. 1 as a stored value 157 thereof. In one certain embodiments, the initial speed increase is within the range of approximately one mile an hour (1 mph) to two miles per hour (2 mph); however, this may vary in other embodiments. In various embodiments, the speed increase for the host vehicle 100 is commanded via instructions provided by the processor 142 of FIG. 1 that are then implemented by the drive system 110 of FIG. 1.

In addition, also in various embodiments during 212, the host vehicle 100 is also moved into an adjacent lane, or passing lane (e.g., corresponding to the second lane 302 of FIG. 3) in accordance with instructions provided by the processor 142 and implemented by the steering system 108 of FIG. 1. In various embodiments, the process then proceeds to 214, described below.

In various embodiments, during 214, a determination is made as to whether the system is disabled. In various embodiments, the processor 142 of FIG. 1 determines whether the control system 102, the automatic overtake functionality, and/or the cruise control functionality is disabled, for example via user inputs as detected by the input sensors 134 of FIG. 1.

In various embodiments, if it is determined that the system is disabled, then the vehicle overtake is deemed to be completed (215), and the process proceeds to 224, described further below (in which the passing response is suspended). Conversely, in various embodiments, if it is instead determined that the system is not disabled, the process proceeds instead to 216, described below.

In various embodiments, during 216, a determination is made as to whether the host vehicle has passed the target vehicle. In various embodiments, the processor 142 of FIG. 1 determines that the host vehicle has passed the target vehicle when the host vehicle 100 has completely passed the target vehicle 310 longitudinally, such that it is safe for the host vehicle 100 to return to its original lane (e.g., the first lane 301 of FIG. 1).

In various embodiments, if it is determined that the host vehicle has passed the target vehicle, then the vehicle overtake is deemed to be completed (215), and the process proceeds to 224, described further below (in which the passing response is suspended). Conversely, in various embodiments, if it is instead determined that the host vehicle has not passed the target vehicle, the process proceeds instead to 218, described below.

In various embodiments, during 218, a determination is made as to whether the overtake action has exceeded a predetermined threshold. In various embodiments, the processor 142 of FIG. 1 determines whether the overtake action (e.g., the passing action or event) has occurred (e.g., beginning with the speed increase of 212) for greater than a predetermined threshold amount of time. In various embodiments, this predetermined threshold is stored in the memory 144 of FIG. 1 as a stored value 157 thereof. In one certain embodiments, the predetermined threshold is equal to approximately fifteen seconds (15 sec); however, this may vary in other embodiments. In certain embodiments, this threshold may vary based on how close in distance the host vehicle 100 is to the target vehicle. For example, in one exemplary embodiment, if the process has been commanding a speed increase for fifteen seconds (15 sec) and the target vehicle on the right is fifty meters (50 m) in front of the host vehicle 100, then a speed decrease may be commanded. On the other hand, in an exemplary embodiment, if the process has been commanding a speed increase for forty-five seconds (45 sec) and the target vehicle on the right is only one meter (1 m) in front of the host vehicle 100, then the speed may be held at the same speed, and so on.

In various embodiments, if it is determined that the overtake action has exceeded the predetermined threshold, then the vehicle overtake is deemed to be completed (215), and the process proceeds to 224, described further below (in which the passing response is suspended). Conversely, in various embodiments, if it is instead determined that the overtake action has not exceeded the predetermined threshold, the process proceeds instead to 220, described below.

In various embodiments, during 220, a determination is made as to whether the overtake validity conditions of 210 (discussed above) are still valid with respect to passing the target vehicle. In various embodiments, the processor 142 of FIG. 1 makes this determination based on whether a velocity difference between the host vehicle 100 and the target vehicle still exceeds a predetermined speed difference threshold and as to whether a distance between the host vehicle 100 and the target vehicle is still less than a predetermined distance threshold (e.g., similar to the discussion above).

In various embodiments, if it is determined that the overtake validity conditions are no longer valid, then the vehicle overtake is deemed to be completed (215), and the process proceeds to 224, described further below (in which the passing response is suspended). Conversely, in various embodiments, if it is instead determined that the overtake validity conditions are still valid, the process proceeds instead to 222, described below.

In various embodiments, during 222, a determination is made as to whether the vehicle overtake is still feasible. In various embodiments, the processor 142 of FIG. 1 makes this determination based at least in part on whether a further velocity increase required of the host vehicle 100 to overtake the target vehicle would exceed a maximum velocity increase for the host vehicle 100. In certain embodiments, the maximum velocity increase refers to a maximum permitted change in velocity over a pre-set velocity selected by a driver or other user of the vehicle (e.g., as part of a cruise control functionality for the vehicle 100). Accordingly, in certain embodiments, the velocity has already been increased to some degree in 212 over the pre-set velocity, and during 222 the processor 142 determines whether any further velocity increase required to overtake the target vehicle (when added to the initial increase of 212) would together (as a sum) exceed the maximum permitted change in velocity. In various embodiments, the maximum permitted change in velocity is stored in the memory 144 of FIG. 1 as a stored value 157 thereof. In one certain embodiments, the maximum permitted change in velocity is equal to approximately two miles per hour (2 mph); however, this may vary in other embodiments.

In various embodiments, the processor 142 of FIG. 1 makes the determinations of 222 also based on a modelling of a "pull zone" (in which it is optimal for the host vehicle 100 to pass in front of the target vehicle and then return to the original lane) versus a "push zone" (in which it is optimal for the host vehicle 100 to slow down behind the target vehicle and then return to the original lane). With reference to FIG. 3, the "pull zone" is represented as pull zone 330, and the "push zone" is represented at push zone 340. Also as depicted in FIG. 3, an intermediate zone 350 may lie in between the pull zone 330 and the push zone 350, which may require additional determinations and evaluations.

In various embodiments, the decision as to whether the host vehicle 100 should pass in front of or fall back behind the target vehicle may be approximated as:

$$U = A/R^n_{x1} + B/R^m_{x2} \quad \text{(Equation 1),}$$

in which: (i) A represents a passing assertion modelled as $f \sim V_h$, $\Delta x$, $\Delta V_x$, wherein $\Delta x$ is established between the rear bumper of the target vehicle and a look-up table (stored in the memory 144 of FIG. 1) based parameter for the lower boundary extending towards the host vehicle 100, in an exemplary embodiment; (ii) B represents a fallback assertion modelled as $f \sim V_h$, $\Delta x$, $\Delta V_x$, wherein $\Delta x$ is established between the front bumper of the target vehicle and a look-up table (stored in the memory 144 of FIG. 1) based parameter for the upper boundary extending away from the host vehicle 100, in an exemplary embodiment.

Also in various embodiments: $R^n_{x1}$ of Equation 1 represents a pull zone weight, in accordance with the following equation:

$$R^n_{x1} = S_{pull\ zone}/D_{pull\ zone} \quad \text{(Equation 2),}$$

in which $S_{pull\ zone}$ represents the size of the pull zone 330 of FIG. 3, and $D_{pull\ zone}$ represents a distance from the vehicle 100 to the pull zone 330 of FIG. 3.

Also in various embodiments: $R^n_{x2}$ of Equation 1 represents a push zone weight, in accordance with the following equation:

$$R^n_{x2} = S_{push\ zone}/D_{push\ zone} \quad \text{(Equation 3),}$$

in which $S_{push\ zone}$ represents the size of the push zone 340 of FIG. 3, and $D_{push\ zone}$ represents a distance from the vehicle 100 to the push zone 340 of FIG. 3.

Also in certain embodiments, the sizes of the pull zone 330 and the push zone 340 may be modelled dynamically through look-up table and environmental parameters, such as in accordance with the following equation:

$$S = \min\ (\text{Lookup} v_{current}, V_{current}/V_{set} * \text{Gain} V_x) \quad \text{(Equation 4),}$$

in which $V_{current}$ represents the current velocity of the vehicle 100, $V_{set}$ represents the velocity set by a driver or other user of the vehicle 100 (e.g., via cruise control), and $\text{Gain} V_x$ represents the total velocity increase for the host vehicle 100 during the vehicle overtake maneuver. Also in various embodiments, "n" and "m" are parameters that may be ascertained via a look-up table based on host vehicle velocity, road speed limit, and driver selected speed.

In various embodiments, if it is determined that the vehicle overtake is still feasible, then the process returns to 212, and the speed of the host vehicle 100 is increased further (while not exceeded the maximum permitted change in velocity). The process then continues beginning with 212 in a new iteration until it is determined that the pass is completed (in an iteration 216) and/or until one or more other exit criteria (such as those described above) are satisfied. Conversely, if it is determined that the vehicle overtake is not feasible, then the vehicle overtake is deemed to be completed (215), and the process proceeds to 224, described below.

During 224, the passing response is suspended. In various embodiments, during 224, the attempting overtake (i.e., passing) of the target vehicle by the host vehicle 100 is stopped, at least temporarily. In various embodiments, the host vehicle 100 speed is reduced accordingly in order to return to the first lane 301 behind the target vehicle 310 of FIG. 1. In various embodiments, the processor 142 provides instructions for the host vehicle 100 to reduce speed to less than the target vehicle 310, and to then return to the first lane 301 when it is safe to do so. In various embodiments, these instructions are then automatically implemented by the braking system 106 and/or drive system 110 of FIG. 1 (e.g., in decreasing the host vehicle 100 velocity) and the steering system 108 of FIG. 1 (e.g., in executing lane change).

In various embodiments, a determination is then made at 226 as to whether the process is to continue. For example, in certain embodiments, the processor 142 determines whether the vehicle 100 is still operating with the control system 102 activated (e.g., with the automatic vehicle overtake and/or cruise control systems and functionality active).

In various embodiments, if it is determined that the process is to continue, then the process returns to 206 in a new iteration (e.g., via 207, described above). Conversely, in various embodiments, if it is instead determined that the process is not to continue, then the process terminates at 228.

Accordingly, methods, systems, and vehicles are provided for controlling vehicle overtakes of target vehicles. In various embodiments, the control of the vehicle overtake is make automatically by a computer control system based on dynamic traffic conditions, including changes in velocity of both the host vehicle and the target vehicle, changes in the distance between the host vehicle and the target vehicle, and other changing traffic conditions.

It will be appreciated that the systems, vehicles, and methods may vary from those depicted in the Figures and described herein. For example, the vehicle 100 of FIG. 1, the control system 102 thereof, and/or components thereof of FIG. 1 may vary in different embodiments. It will similarly be appreciated that the steps of the process 200 may differ from that depicted in FIG. 2, and/or that various steps of the process 200 may occur concurrently and/or in a different order than that depicted in FIG. 2. It will similarly be appreciated that the implementations of FIG. 3 may also differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
    obtaining, via one or more sensors of a host vehicle, vehicle sensor data pertaining to a target vehicle in proximity to the host vehicle;
    beginning an overtake maneuver for the host vehicle, via instructions provided by a processor of the host vehicle, with an initial increase in velocity for the host vehicle, when conditions for an overtake of the target vehicle by the host vehicle are initially determined by the processor to be valid;
    subsequent to the beginning of the overtake maneuver, determining via the processor whether the conditions for the overtake of the target vehicle are still valid, based on updated sensor data reflecting variant traffic conditions; and
    further controlling the overtake maneuver based on the determining as to whether the conditions for the overtake of the target vehicle are still valid, via the instructions provided by the processor, by:
        calculating, via the processor, a further increase in velocity that would be required to successfully complete the overtake maneuver; and
        selectively completing the overtake maneuver based on whether the further increase in velocity, in combination with the initial increase in velocity, would exceed a pre-set velocity as selected by a user of the host vehicle by an amount that is less than or equal to a predetermined maximum velocity change threshold that is stored in a memory of the host vehicle.

2. The method of claim 1, wherein the conditions for the overtake of the target vehicle are based at least in part on a speed of the host vehicle, a relative speed between the host vehicle and the target vehicle, and a distance between the host vehicle and the target vehicle.

3. The method of claim 2, wherein the conditions for the overtake of the target vehicle are also based at least in part on one or more additional target vehicles in proximity to the host vehicle.

4. The method of claim 1, wherein further controlling the overtake maneuver comprises:
    continuing the overtake maneuver via the instructions provided by the processor, when it is determined by the processor that the conditions for the overtake of the target vehicle are still valid; and
    suspending the overtake maneuver via the instructions provided by the processor, when it is determined by the processor that the conditions for the overtake of the target vehicle are no longer valid.

5. The method of claim 1, wherein the determining of whether the conditions for the overtake of the target vehicle are still valid is based at least in part on a comparison of:
    a pull zone, in which the host vehicle would speed up further to pass in front of the target vehicle; and
    a push zone, in which the host vehicle would slow down to return to an original lane behind the target vehicle.

6. The method of claim 5, wherein the determining of whether the conditions for the overtake of the target vehicle are still valid is based at least in part on:
    a pull zone weight, based on a distance of the host vehicle from a rear bumper of the target vehicle; and
    a push zone weight, based on a distance of the host vehicle from a front bumper of the target vehicle.

7. A system comprising:
    a sensor array comprising one or more sensors of a host vehicle, the sensor array configured to generate vehicle sensor data pertaining to a target vehicle in proximity to the host vehicle; and
    a processor coupled to the sensor array and configured to at least facilitate:
        beginning an overtake maneuver for the host vehicle with an initial increase in velocity for the host vehicle when conditions for an overtake of the target vehicle by the host vehicle are initially determined by the processor to be valid;
        subsequent to the beginning of the overtake maneuver, determining whether the conditions for the overtake of the target vehicle are still valid, based on updated sensor data reflecting variant traffic conditions; and
        further controlling the overtake maneuver based on the determining as to whether the conditions for the overtake of the target vehicle are still valid, by:
            calculating, via the processor, a further increase in velocity that would be required to successfully complete the overtake maneuver; and
            selectively completing the overtake maneuver based on whether the further increase in velocity, in combination with the initial increase in velocity, would exceed a pre-set velocity as selected by a user of the host vehicle by an amount that is less than or equal to a predetermined maximum velocity change threshold that is stored in a memory of the host vehicle.

8. The system of claim 7, wherein the conditions for the overtake of the target vehicle are based at least in part on a speed of the host vehicle, a relative speed between the host vehicle and the target vehicle, and a distance between the host vehicle and the target vehicle.

9. The system of claim 8, wherein the conditions for the overtake of the target vehicle are also based at least in part on one or more additional target vehicles in proximity to the host vehicle.

10. The system of claim 7, wherein the processor is further configured to at least facilitate:
continuing the overtake maneuver when it is determined by the processor that the conditions for the overtake of the target vehicle are still valid; and
suspending the overtake maneuver when it is determined by the processor that the conditions for the overtake of the target vehicle are no longer valid.

11. The system of claim 7, wherein the processor is further configured to at least facilitate determining whether the conditions for the overtake of the target vehicle are still valid based at least in part on a change in speed of the target vehicle and also based at least in part on whether a required change in speed of the host vehicle to overtake the target vehicle would exceed a predetermined speed threshold.

12. The system of claim 7, wherein the processor is further configured to at least facilitate determining whether the conditions for the overtake of the target vehicle are still valid based at least in part on a comparison of:
a pull zone, in which the host vehicle would speed up further to pass in front of the target vehicle; and
a push zone, in which the host vehicle would slow down to return to an original lane behind the target vehicle.

13. The system of claim 12, wherein the processor is further configured to at least facilitate determining whether the conditions for the overtake of the target vehicle are still valid based at least in part on:
a pull zone weight, based on a distance of the host vehicle from a rear bumper of the target vehicle; and
a push zone weight, based on a distance of the host vehicle from a front bumper of the target vehicle.

14. A host vehicle comprising:
a body;
a drive system configured to generate movement of the body;
a sensor array comprising one or more sensors of the host vehicle, the sensor array configured to generate vehicle sensor data pertaining to a target vehicle in proximity to the host vehicle; and
a processor coupled to the sensor array and configured to at least facilitate:
beginning an overtake maneuver for the host vehicle, via instructions provided to the drive system, with an initial increase in velocity for the host vehicle, when conditions for an overtake of the target vehicle by the host vehicle are initially determined by the processor to be valid;
subsequent to the beginning of the overtake maneuver, determining via the processor whether the conditions for the overtake of the target vehicle are still valid, based on updated sensor data reflecting variant traffic conditions; and
further controlling the overtake maneuver based on the determining as to whether the conditions for the overtake of the target vehicle are still valid, by:
calculating, via the processor, a further increase in velocity that would be required to successfully complete the overtake maneuver; and
selectively completing the overtake maneuver based on whether the further increase in velocity, in combination with the initial increase in velocity, would exceed a pre-set velocity selected by a user of the host vehicle by an amount that is less than or equal to a predetermined maximum velocity change threshold that is stored in a memory of the host vehicle.

15. The host vehicle of claim 14, wherein the conditions for the overtake of the target vehicle are based at least in part on a speed of the host vehicle, a relative speed between the host vehicle and the target vehicle, and a distance between the host vehicle and the target vehicle.

16. The host vehicle of claim 14, wherein the processor is further configured to at least facilitate:
continuing the overtake maneuver when it is determined by the processor that the conditions for the overtake of the target vehicle are still valid; and
suspending the overtake maneuver when it is determined by the processor that the conditions for the overtake of the target vehicle are no longer valid.

17. The host vehicle of claim 14, wherein the processor is further configured to at least facilitate determining whether the conditions for the overtake of the target vehicle are still valid based at least in part on a change in speed of the target vehicle and also based at least in part on whether a required change in speed of the host vehicle to overtake the target vehicle would exceed a predetermined speed threshold.

18. The host vehicle of claim 14, wherein the processor is further configured to at least facilitate determining whether the conditions for the overtake of the target vehicle are still valid based at least in part on a comparison of:
a pull zone, in which the host vehicle would speed up further to pass in front of the target vehicle; and
a push zone, in which the host vehicle would slow down to return to an original lane behind the target vehicle.

19. The host vehicle of claim 18, wherein the processor is further configured to at least facilitate determining whether the conditions for the overtake of the target vehicle are still valid based at least in part on:
a pull zone weight, based on a distance of the host vehicle from a rear bumper of the target vehicle; and
a push zone weight, based on a distance of the host vehicle from a front bumper of the target vehicle.

20. The method of claim 1, further comprising:
calculating, via the processor, a sum of the initial increase in velocity and the further increase in velocity; and
calculating, via the processor, a difference between the sum and the pre-set velocity selected by a user of the host vehicle as part of a cruise control feature of the host vehicle;
wherein selectively completing the overtake maneuver comprises:
completing the overtake maneuver, in conjunction with the instructions provided by the processor, when the difference is less than or equal to the predetermined maximum velocity change threshold that is stored in the memory of the host vehicle; and
aborting the overtake maneuver, in conjunction with the instructions provided by the processor, when the difference is greater than the predetermined maximum velocity change threshold that is stored in the memory of the vehicle.

* * * * *